United States Patent
Sinha et al.

(10) Patent No.: US 12,307,567 B2
(45) Date of Patent: May 20, 2025

(54) METHODS AND SYSTEMS FOR EMOTION-CONTROLLABLE GENERALIZED TALKING FACE GENERATION

(71) Applicant: Tata Consultancy Services Limited, Mumbai (IN)

(72) Inventors: Sanjana Sinha, Kolkata (IN); Sandika Biswas, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 366 days.

(21) Appl. No.: 18/163,704

(22) Filed: Feb. 2, 2023

(65) Prior Publication Data
US 2023/0351662 A1   Nov. 2, 2023

(30) Foreign Application Priority Data
Apr. 28, 2022   (IN) .............................. 202221025055

(51) Int. Cl.
*G06T 13/40*   (2011.01)
*G06N 3/0455*   (2023.01)
(Continued)

(52) U.S. Cl.
CPC .......... *G06T 13/40* (2013.01); *G06N 3/0455* (2023.01); *G06T 13/205* (2013.01);
(Continued)

(58) Field of Classification Search
None
See application file for complete search history.

(56) References Cited

U.S. PATENT DOCUMENTS 7,340,393 B2   3/2008   Mitsuyoshi

FOREIGN PATENT DOCUMENTS

CN   113299255 A   8/2021

OTHER PUBLICATIONS

Eskimez, Sefik Emre et al., "Speech Driven Talking Face Generation from a Single Image and an Emotion Condition", Transactions on Multimedia, Date: Jul. 2021, vol. 24, pp. 3480-3490, Publisher: IEEE, https://arxiv.org/pdf/2008.03592.pdf.

(Continued)

*Primary Examiner* — Yi Wang
(74) *Attorney, Agent, or Firm* — Finnegan, Henderson, Farabow, Garrett & Dunner, LLP

(57) ABSTRACT

This disclosure relates generally to methods and systems for emotion-controllable generalized talking face generation of an arbitrary face image. Most of the conventional techniques for the realistic talking face generation may not be efficient to control the emotion over the face and have limited scope of generalization to an arbitrary unknown target face. The present disclosure proposes a graph convolutional network that uses speech content feature along with an independent emotion input to generate emotion and speech-induced motion on facial geometry-aware landmark representation. The facial geometry-aware landmark representation is further used in by an optical flow-guided texture generation network for producing the texture. A two-branch optical flow-guided texture generation network with motion and texture branches is designed to consider the motion and texture content independently. The optical flow-guided texture generation network then renders emotional talking face animation from a single image of any arbitrary target face.

13 Claims, 9 Drawing Sheets

(51) Int. Cl.
G06T 13/20 (2011.01)
G06V 10/80 (2022.01)
G06V 40/16 (2022.01)
G10L 25/63 (2013.01)

(52) U.S. Cl.
CPC .......... *G06V 10/806* (2022.01); *G06V 40/171* (2022.01); *G10L 25/63* (2013.01)

(56) References Cited

OTHER PUBLICATIONS

Wang, Suzhen et al., "One-shot Talking Face Generation from Single-speaker Audio-Visual Correlation Learning", Computer Vision and Pattern Recognition, Date: Dec. 2021, Publisher: Arxiv, https://arxiv.org/pdf/2112.02749.pdf.

Zhang, Zhimeng et al., "Flow-guided One-shot Talking Face Generation with a High-resolution Audio-visual Dataset", Conference on Computer Vision and Pattern Recognition (CVPR), Date: 2021, Publisher: IEEE, https://openaccess.thecvf.com/content/CVPR2021/papers/Zhang_Flow-Guided_One-Shot_Talking_Face_Generation_With_a_High-Resolution_Audio-Visual_Dataset_CVPR_2021_paper.pdf.

Wang, Kaisiyuan et al., "MEAD: A Large-Scale Audio-Visual Dataset for Emotional Talking-Face Generation", European Conference on Computer Vision, Date: Nov. 2020, pp. 700-717, Publisher: Springer, https://wywu.github.io/projects/MEAD/support/MEAD.pdf.

METHODS AND SYSTEMS FOR EMOTION-CONTROLLABLE GENERALIZED TALKING FACE GENERATION

PRIORITY CLAIM

This U.S. patent application claims priority under 35 U.S.C. § 119 to: Indian Patent Application No. 202221025055, filed on Apr. 28, 2022. The entire contents of the aforementioned application are incorporated herein by reference.

TECHNICAL FIELD

The disclosure herein generally relates to the field of an emotional talking face (animated face) generation, and, more particularly, to methods and systems for emotion-controllable generalized talking face generation of an arbitrary face image.

BACKGROUND

Realistic talking face generation from audio is a process of producing the emotion rendered talking face based on the emotions present in the given audio. The realistic talking face generation is a very popular field in application areas such as audio-visual digital assistant, enterprise chatbots for automated customer services, video dubbing, avatar-based video-conferencing, animated avatars for internet content creation, telepresence, virtual reality, gaming, CGI animation movies, and so on.

Most of the conventional techniques for the realistic talking face generation mainly focused on generating realistic lip synchronization (sync.), eye motions or head motions in the talking head. Due to the limited availability of annotated emotional audio-visual datasets, some of the conventional techniques for the realistic talking face generation, have tried to learn the facial emotions implicitly from the audio. However, these conventional techniques may not be efficient to control the emotion over the face and often may not produce the realistic animated talking face images.

Further, some of the conventional techniques for the realistic talking face generation generates emotion only in the upper part of the face (from external emotion control using one-hot emotion vector) and the lower part of the face is animated from audio independently, which results in inconsistent emotions over the face. Some other conventional techniques for the realistic talking face generation focuses on generating consistent emotions over the full face using a disentangled emotion latent feature learned from the audio. However, these techniques rely on intermediate global landmarks (or edge maps) to generate the texture directly with emotions. Hence the conventional techniques for the realistic talking face generation have limited scope of generalization to an arbitrary unknown target face.

SUMMARY

Embodiments of the present disclosure present technological improvements as solutions to one or more of the above-mentioned technical problems recognized by the inventors in conventional systems.

In an aspect, a processor-implemented method for emotion-controllable generalized talking face generation is provided. The method including the steps of: receiving a plurality of training samples, wherein each training sample of the plurality of training samples comprises a speech audio input data, an emotion input data comprising an emotion type and an emotion intensity, an input image of a target subject in a neutral emotion, and a ground-truth image corresponding to the emotion input data; training a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises: obtaining a set of emotion-invariant speech embedding features, from the speech audio input data present in the training sample, using the audio encoder network; obtaining a set of first emotion embedding features, from the emotion input data present in the training sample, using the first emotion encoder network; obtaining a set of graph embedding features, from the input image of the target subject in the neutral emotion present in the training sample, using the graph encoder network; concatenating (i) the set of emotion-invariant speech embedding features, (ii) the set of first emotion embedding features, and (iii) the set of graph embedding features, to obtain concatenated embedding features of the training sample; decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample; minimizing a loss function of the geometry-aware landmark generation network, wherein the loss function computes a difference between the predicted landmark graph of the training sample, and a ground-truth landmark graph obtained from the ground-truth image corresponding to the training sample; and updating weights of the geometry-aware landmark generation network, based on the minimization of the loss function of the geometry-aware landmark generation network; training a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises: obtaining a set of identity features from the input image of the target subject in the neutral emotion present in the training sample, using the image encoder network; obtaining a set of differential landmark features, from the predicted landmark graph of the training sample and the neutral landmark graph corresponding to the input image of the target subject in the neutral emotion present in the training sample, using the landmark encoder network; obtaining a set of second emotion embedding features, from the emotion input data present in the training sample, using the second emotion encoder network; combining (i) the set of identity features, (ii) the set of differential landmark features, (iii) the set of second emotion embedding features, to obtain a dense flow map and an occlusion map, for the training sample, using the feature concatenation encoder-decoder network;

passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample; minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network; receiving a speech audio data, an emotion data comprising the emotion type and the emotion intensity, and an image of an arbitrary target subject in a neutral emotion; predicting the landmark graph of the arbitrary target subject, from the speech audio data, the emotion data, and the image of the arbitrary target subject in the neutral emotion, using the trained speech and emotion driven geometry-aware landmark generation model; and generating an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

In another aspect, a system for emotion-controllable generalized talking face generation is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of training samples, wherein each training sample of the plurality of training samples comprises a speech audio input data, an emotion input data comprising an emotion type and an emotion intensity, an input image of a target subject in a neutral emotion, and a ground-truth image corresponding to the emotion input data; train a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises: obtaining a set of emotion-invariant speech embedding features, from the speech audio input data present in the training sample, using the audio encoder network; obtaining a set of first emotion embedding features, from the emotion input data present in the training sample, using the first emotion encoder network; obtaining a set of graph embedding features, from the input image of the target subject in the neutral emotion present in the training sample, using the graph encoder network; concatenating (i) the set of emotion-invariant speech embedding features, (ii) the set of first emotion embedding features, and (iii) the set of graph embedding features, to obtain concatenated embedding features of the training sample; decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample; minimizing a loss function of the geometry-aware landmark generation network, wherein the loss function computes a difference between the predicted landmark graph of the training sample, and a ground-truth landmark graph obtained from the ground-truth image corresponding to the training sample; and updating weights of the geometry-aware landmark generation network, based on the minimization of the loss function of the geometry-aware landmark generation network; train a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises: obtaining a set of identity features from the input image of the target subject in the neutral emotion present in the training sample, using the image encoder network; obtaining a set of differential landmark features, from the predicted landmark graph of the training sample and the neutral landmark graph corresponding to the input image of the target subject in the neutral emotion present in the training sample, using the landmark encoder network; obtaining a set of second emotion embedding features, from the emotion input data present in the training sample, using the second emotion encoder network; combining (i) the set of identity features, (ii) the set of differential landmark features, (iii) the set of second emotion embedding features, to obtain a dense flow map and an occlusion map, for the training sample, using the feature concatenation encoder-decoder network; passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample; minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network; receive a speech audio data, an emotion data comprising the emotion type and the emotion intensity, and an image of an arbitrary target subject in a neutral emotion; predict the landmark graph of the arbitrary target subject, from the speech audio data, the emotion data, and the image of the arbitrary target subject in the neutral emotion, using the trained speech and emotion driven geometry-aware landmark generation model; and generate an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

In yet another aspect, there is provided one or more non-transitory machine-readable information storage mediums comprising one or more instructions which when executed by one or more hardware processors cause: receiving a plurality of training samples, wherein each training sample of the plurality of training samples comprises a speech audio input data, an emotion input data comprising an emotion type and an emotion intensity, an input image of a target subject in a neutral emotion, and a ground-truth image corresponding to the emotion input data; training a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises: obtaining a set of emotion-invariant speech embedding features, from the speech audio input data present in the training sample, using the audio encoder network; obtaining a set of first emotion embedding features, from the emotion input data present in the training sample, using the first emotion encoder network; obtaining a set of graph embedding features, from the input image of the target subject in the neutral emotion present in the training sample, using the graph encoder network; concatenating (i) the set of emotion-invariant speech embedding features, (ii) the set of first emotion embedding features, and (iii) the set of graph embedding features, to obtain concatenated embedding features of the training sample; decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample; minimizing a loss function of the geometry-aware landmark generation network, wherein the loss function computes a difference between the predicted landmark graph of the training sample, and a ground-truth landmark graph obtained from the ground-truth image corresponding to the training sample; and updating weights of the geometry-aware landmark generation network, based on the minimization of the loss function of the geometry-aware landmark generation network; training a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises: obtaining a set of identity features from the input image of the target subject in the neutral emotion present in the training sample, using the image encoder network; obtaining a set of differential landmark features, from the predicted landmark graph of the training sample and the neutral landmark graph corresponding to the input image of the target subject in the neutral emotion present in the training sample, using the landmark encoder network; obtaining a set of second emotion embedding features, from the emotion input data present in the training sample, using the second emotion encoder network; combining (i) the set of identity features, (ii) the set of differential landmark features, (iii) the set of second emotion embedding features, to obtain a dense flow map and an occlusion map, for the training sample, using the feature concatenation encoder-decoder network; passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample; minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network; receiving a speech audio data, an emotion data comprising the emotion type and the emotion intensity, and an image of an arbitrary target subject in a neutral emotion; predicting the landmark graph of the arbitrary target subject, from the speech audio data, the emotion data, and the image of the arbitrary target subject in the neutral emotion, using the trained speech and emotion driven geometry-aware landmark generation model; and generating an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

In an embodiment, the set of emotion-invariant speech embedding features, from the speech audio input data present in the training sample, using the audio encoder network, is obtained by: extracting a set of DeepSpeech features, from the speech audio input data present in the training sample, using a pre-trained DeepSpeech network; and encoding the set of DeepSpeech features, using the audio encoder network, to obtain the set of emotion-invariant speech embedding features for the training sample.

In an embodiment, the set of first emotion embedding features, from the emotion input data present in the training sample, using the first emotion encoder network, is obtained by: obtaining a vector representation of the emotion input data, based on the emotion type and the emotion intensity present in the training sample, using a one-hot encoding technique; and encoding the vector representation of the emotion input data, using the first emotion encoder network, to obtain the set of first emotion embedding features.

In an embodiment, the set of graph embedding features, from the input image of the target subject in the neutral emotion present in the training sample, using the graph encoder network, is obtained by: generating a neutral landmark graph, for the input image of the target subject in the neutral emotion present in the training sample, using a facial landmark extraction technique followed by a Delaunay triangulation; and encoding the neutral landmark graph, using the graph encoder network, to obtain the set of graph embedding features for the training sample, wherein the graph encoder network employs a graph convolution technique.

In an embodiment, the set of second emotion embedding features, from the emotion input data present in the training sample, using the second emotion encoder network, is obtained by: obtaining a vector representation of the emotion input data, based on the emotion type and the emotion intensity present in the training sample, using a one-hot encoding technique; and encoding the vector representation of the emotion input data, using the second emotion encoder network, to obtain the set of second emotion embedding features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
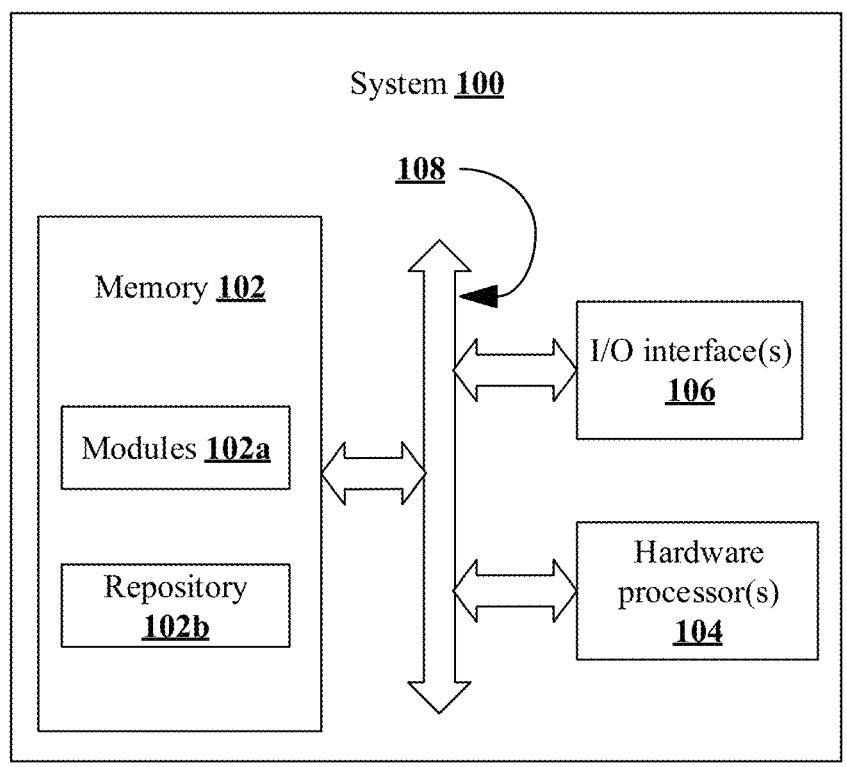
FIG. 1 is an exemplary block diagram of a system for emotion-controllable generalized talking face generation, in accordance with some embodiments of the present disclosure.
Figure 2A:
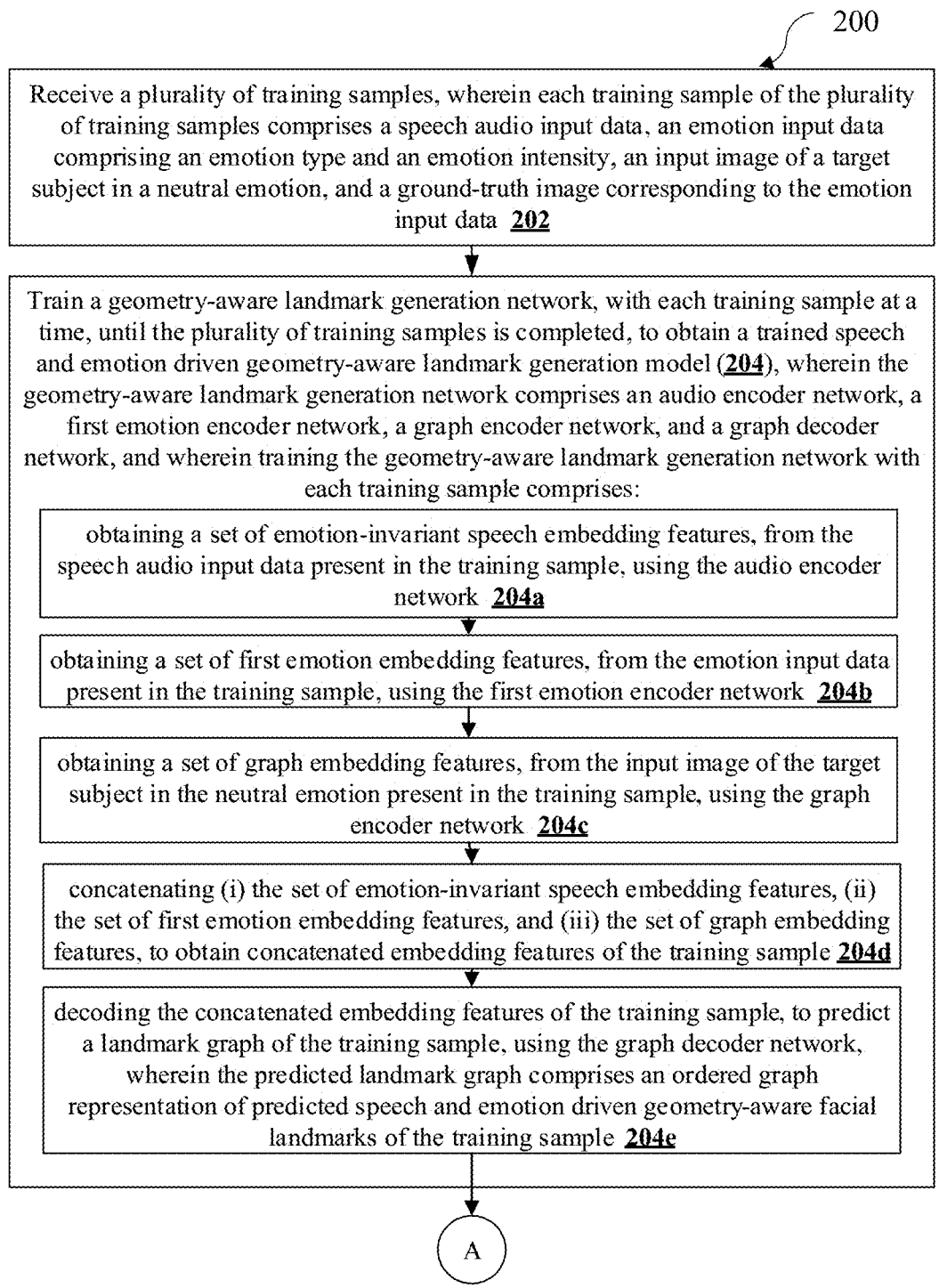
FIG. 2A through FIG. 2D illustrates exemplary flow diagrams of a processor-implemented method for emotion-controllable generalized talking face generation, in accordance with some embodiments of the present disclosure.
Figure 2B:
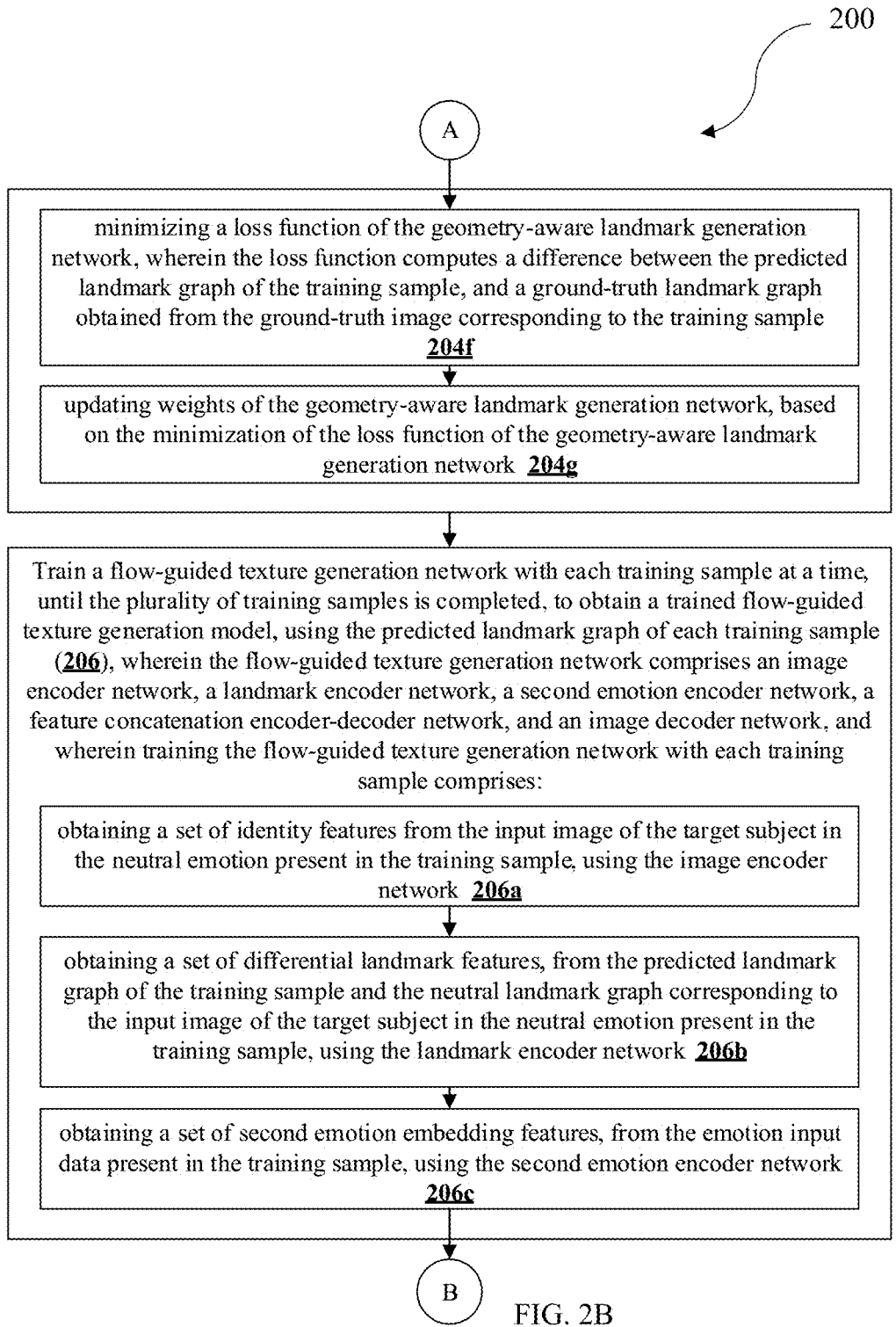
Figure 2C:
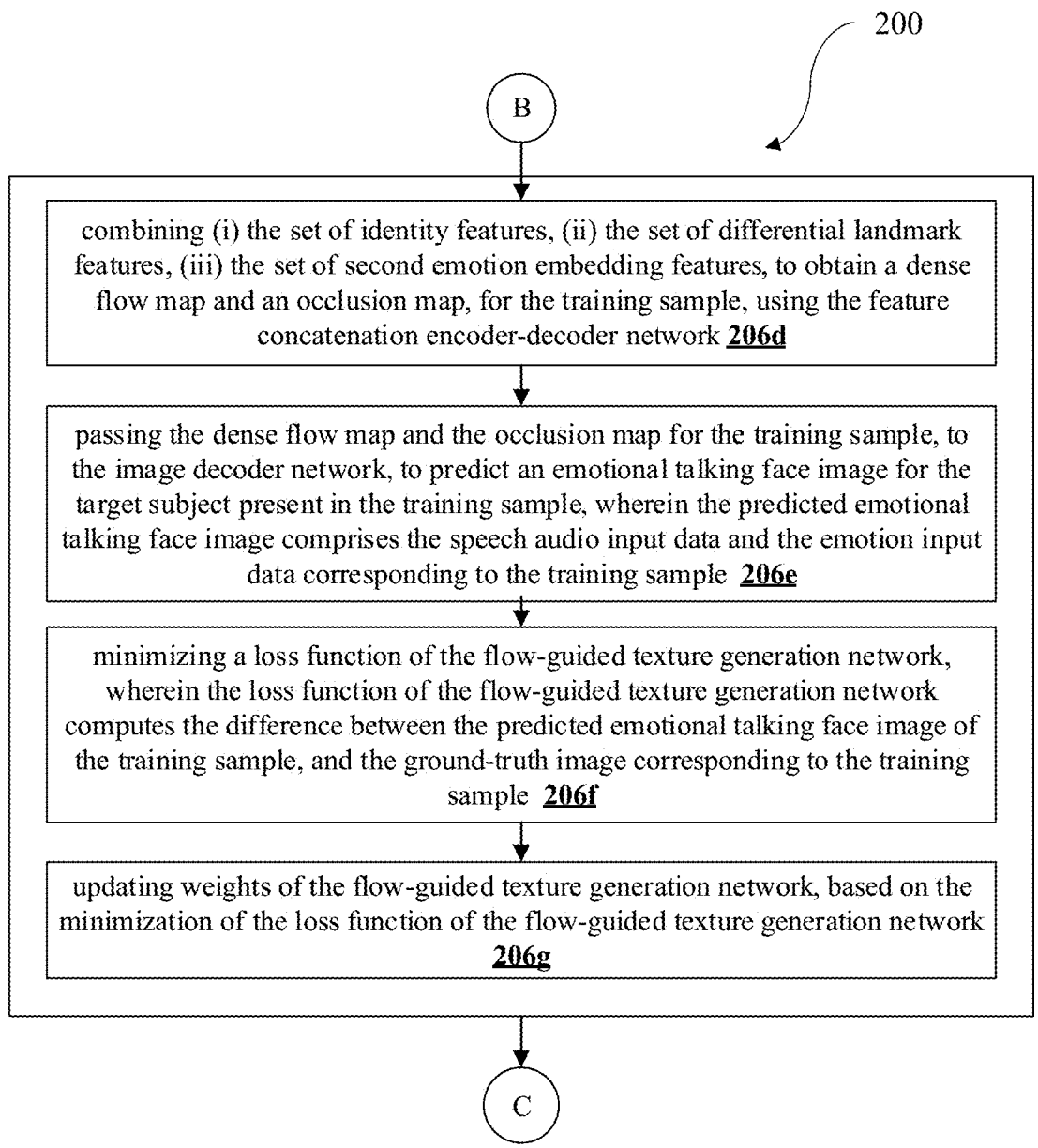
Figure 2D:
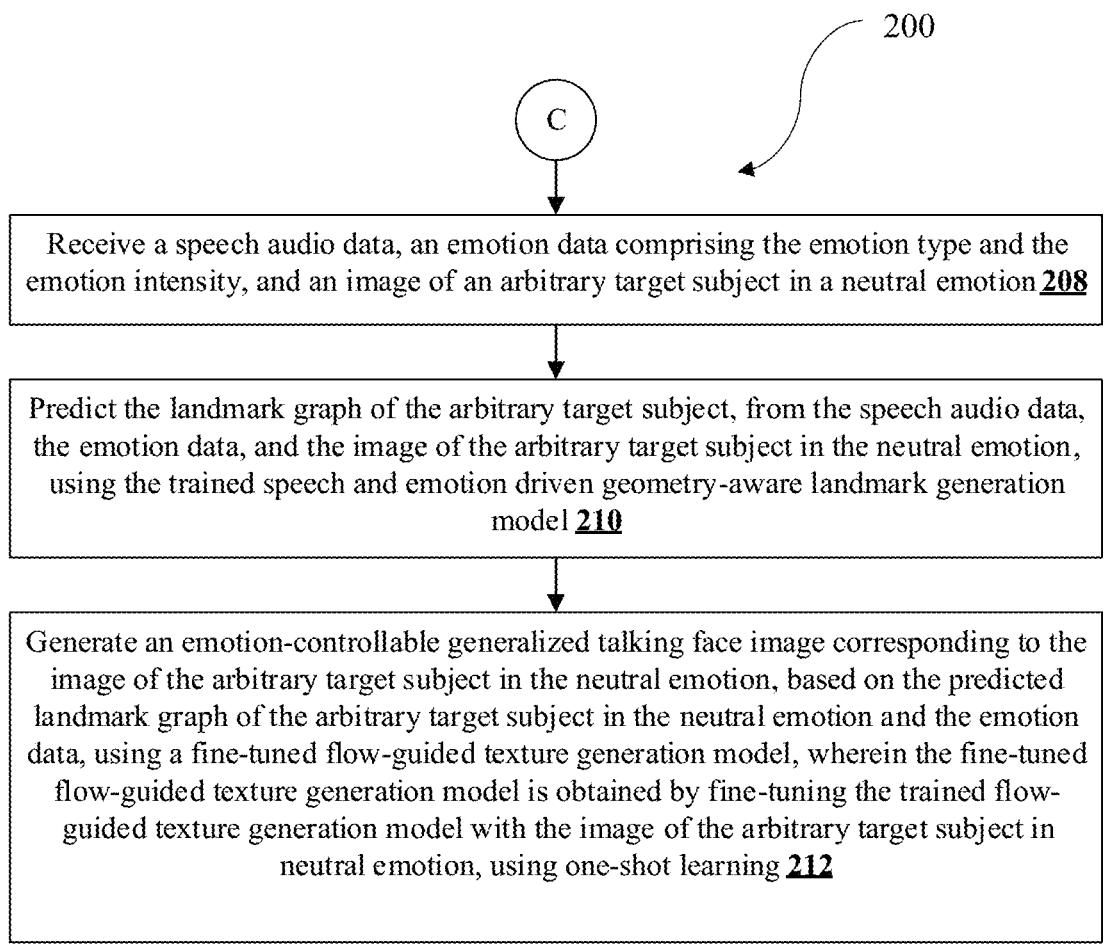

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems for emotion-controllable generalized talking face generation, that addresses the technical problems present in the art, by learning the relationship between the face geometry and the emotion-induced local deformations within the face. Hence the present disclosure generalizes the texture deformation for any unknown face for a given emotion and generates the emotion-controllable generalized talking face generation for the to an arbitrary unknown target face.

The present disclosure proposes a graph convolutional network that uses speech content feature along with an independent emotion input to generate emotion and speech-induced motion on facial geometry-aware landmark representation. The facial geometry-aware landmark representation preserves facial structure and geometry for emotion rendering. The facial geometry-aware landmark representation is further used in by an optical flow-guided texture generation network for producing the texture. A two-branch optical flow-guided texture generation network with motion and texture branches is designed to consider the motion and texture content independently. The optical flow-guided texture generation network then renders emotional talking face animation from a single image of any arbitrary target face.

In the context of the present disclosure, the term 'target subject' means a human, or a person whose talking face image to be generated in accordance with the given speech audio input data and the emotion input data. Further, the terms 'face image', 'input image', 'image' may be interchangeably used based on the context of the present disclosure, however they refer to the image of the face of the target subject.

Referring now to the drawings, and more particularly to FIG. 1 through FIG. 6, where similar reference characters denote corresponding features consistently throughout the figures, there are shown preferred embodiments and these embodiments are described in the context of the following exemplary systems and/or methods.

FIG. 1 is an exemplary block diagram of a system 100 for emotion-controllable generalized talking face generation, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Referring to FIG. 2A through FIG. 2D, components and functionalities of the system 100 are described in accordance with an example embodiment of the present disclosure. For example, FIG. 2A through FIG. 2D illustrates exemplary flow diagrams of a processor-implemented method 200 for emotion-controllable generalized talking face generation, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of training samples. In an embodiment, the plurality of training samples may be stored in the repository 102b as the database. Each training sample of the plurality of training samples includes a speech audio input data, an emotion input data, an input image of a target subject, and a ground-truth image.

The speech audio input data includes a speech information and may be in the form of an audio file with a random audio play length. The emotion input data includes an emotion type and an emotion intensity. The emotion type is one type of the emotion, selected from an emotion type group including happy, sad, angry, fear, surprise, disgust, and so on. The emotion intensity is one of the emotion intensity selected from an emotion type group including low emotion intensity, medium emotion intensity, high emotion intensity, very high emotion intensity, and so on.

The input image of the target subject is a face image of the target subject in the neutral emotion. The neutral emotion refers to the face image in neutral emotion with closed lips. In an embodiment, the target subject may be a human, or a person whose talking face image to be generated in accordance with the speech audio input data and the emotion input data. In an embodiment, the input image of the target subject may be collected from a video in the form of a video frame selected collected based on the neutral emotion type. The ground-truth image is a reference or an annotated face image corresponding to the received emotion input data, may be collected from a video in the form of a video frame. An exemplary training data size of the plurality of training samples may be above 10000 samples.

At step 204 of the method 200, the one or more hardware processors 104 of the system 100 are configured to train a geometry-aware landmark generation network, with the plurality of training samples received at step 202 of the method 200, to obtain a trained speech and emotion driven geometry-aware landmark generation model. In an embodiment, the training of the geometry-aware landmark generation network is performed with each training sample at a time, randomly selected from the plurality of training samples and until the plurality of training samples is completed. In another embodiment, the training of the geometry-aware landmark generation network is performed with a set of training samples randomly selected based on a batch size, from the plurality of training samples and until the plurality of training samples is completed. Further, the training of the geometry-aware landmark generation network is performed until a number of epochs is completed where the plurality of training samples is present in each epoch.

The geometry-aware landmark generation network is constructed in such a way that it will generate the speech and emotion driven geometry-aware facial landmarks in the form of a landmark graph, for each training sample based on the speech audio input data, the emotion input data, the input image of a target subject present in the corresponding training sample. Further, the geometry-aware landmark generation network is trained with the use of the ground-truth image corresponding to the emotion input data present in each training sample, to obtain the trained speech and emotion driven geometry-aware landmark generation model.

Figure 3:
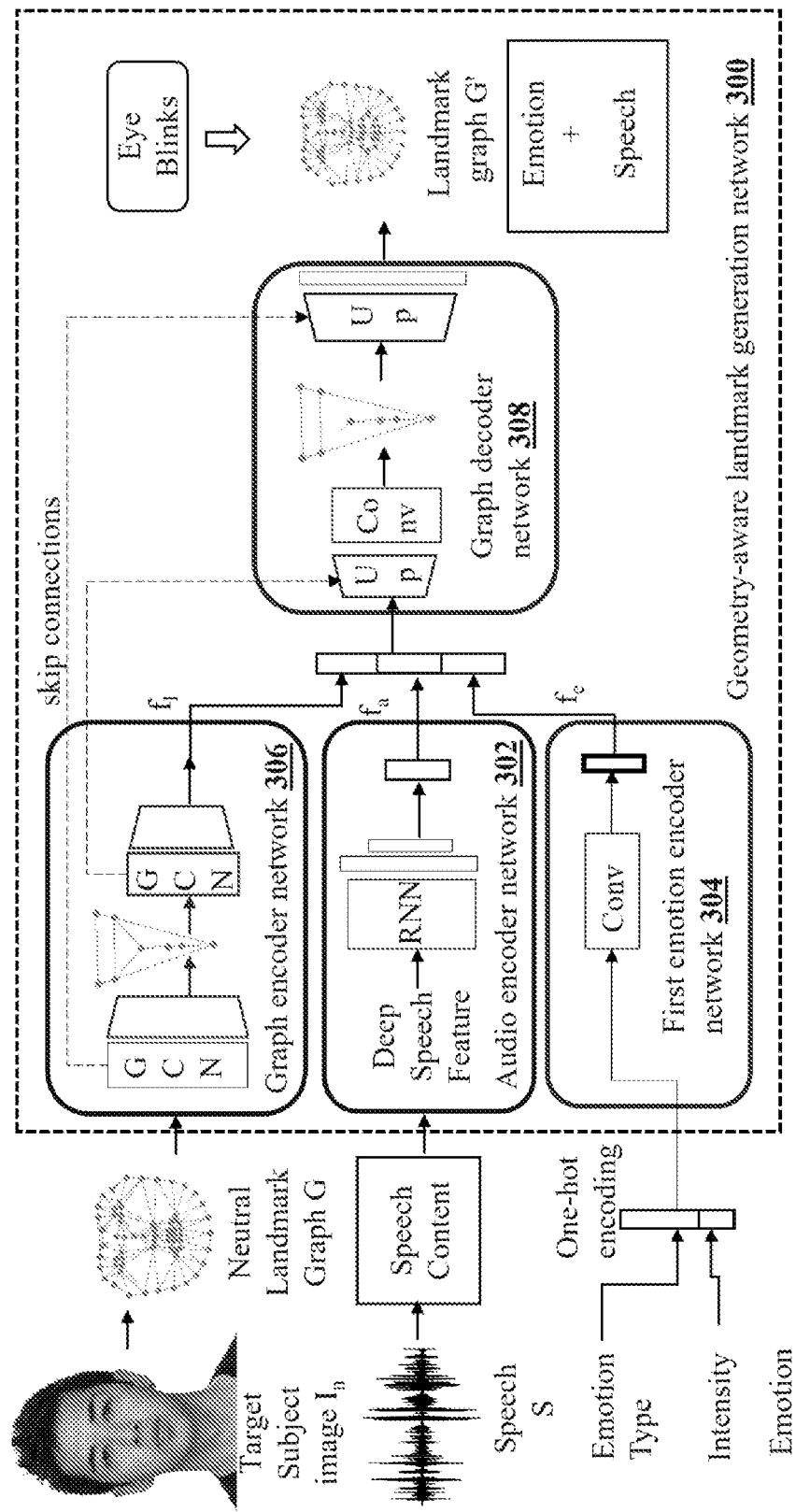
FIG. 3 shows an architecture diagram of a geometry-aware landmark generation network, in accordance with some embodiments of the present disclosure.

FIG. 3 shows an architecture diagram of the geometry-aware landmark generation network 300, in accordance with some embodiments of the present disclosure. As shown in FIG. 3, the geometry-aware landmark generation network 300 includes an audio encoder network 302, a first emotion encoder network 304, a graph encoder network 306, and a graph decoder network 308. In an embodiment, the audio encoder network 302 is a recurrent neural network (RNN). In an embodiment, the graph encoder network 306 is a graph convolutional network (GCN) having a plurality of graph convolutional layers, wherein each graph convolutional layer is followed with a pooling layer. In an embodiment, the first emotion encoder network 304 includes a convolutional layer. Lastly, the graph decoder network 308 includes a first graph up-sampling layer, followed by a convolutional layer, and further followed by a second graph up-sampling layer. A plurality of skip connections is formed, wherein each skip connection is between each graph convolutional layer of the graph encoder network 306 and each graph up-sampling layer of the graph decoder network 308.

The training of the geometry-aware landmark generation network 300 with each training sample is explained in detail through steps 204a to 204g. At step 204a, a set of emotion-invariant speech embedding features, is obtained from the speech audio input data present in the training sample, using the audio encoder network 302. For this, for each audio window of size W corresponding to the speech audio input data present in the training sample, a set of DeepSpeech features D={$a_t \in \mathbb{R}^{W \times 29}$} are extracted from an output layer of a pre-trained DeepSpeech network (before applying Softmax function). The output layer of a pre-trained DeepSpeech network represents log probabilities of 29 characters and hence the set of DeepSpeech features D are emotion-invariant or emotion independent. Then, the obtained set of DeepSpeech features D are encoded using the audio encoder network 302, to obtain the set of emotion-invariant speech embedding features $f_a \in \mathbb{R}^d$ (d=128) for the training sample.

Next at step 204b, a set of first emotion embedding features, is obtained from the emotion input data present in the training sample, using the first emotion encoder network 304. First, a vector representation v(e, i) of the emotion input data, is obtained based on the emotion type e and the emotion intensity i present in the training sample, using a one-hot encoding technique. Then the vector representation v(e, i) of the emotion input data, is encoded using the first emotion encoder network 304, to obtain the set of first emotion embedding features $f_e \in \mathbb{R}^d$ (d=128) for the training sample.

Further at step 204c, a set of graph embedding features, is obtained from the input image of the target subject in the neutral emotion present in the training sample, using the graph encoder network 306. First a neutral landmark graph G=(V, E, A), is obtained for the input image of the target subject in the neutral emotion present in the training sample, using a facial landmark extraction technique followed by a Delaunay triangulation. Where V={$v_l$} denotes the set of L=68 facial landmark vertices, E={$e_{ij}$} is the set of edges computed using the Delaunay triangulation, A is the adjacency matrix. X=[$X_{ij}$]($X_{ij} \in \mathbb{R}^2$) is a matrix of vertex feature vectors, i.e., 2-dimensional image coordinates of the L=68 facial landmarks of the input image of the in the neutral emotion (face in neutral emotion with closed lips). Further, a spectral graph convolution is applied with the modified propagation rule including learnable edge weights comprising:

$$f_{i+1} = \sigma(\tilde{D}^{-\frac{1}{2}}(\hat{A} + I)\tilde{D}^{-\frac{1}{2}} f_i W_i) \quad (1)$$

Where $\hat{A} = \omega A$, I represents an identity matrix, $\tilde{D}^{ii} = \Sigma_j(\hat{A}^{ij} + I^{ij})$, $\omega = \{\omega^{ij}\}$ are learnable edge in the neutral landmark graph G, $f_i$ is the output of the $i^{th}$ layer, ($f_0$=X), $W_i$ is a trainable weight matrix of the $i^{th}$ layer, $\sigma(.)$ Is the activation function. Since the edges between the landmark vertices of semantically connected regions of the face are more significant than the edges connecting two different facial regions, the learnable edge weight ω signifies the contribution of the feature of the vertex to its neighboring vertices. Unlike lip movements, the emotion has an effect over the entire face and not only the specific region.

Further, a hierarchical local-to global scheme is applied for the graph convolution to capture the facial deformation. Graph pooling operation in the graph encoder network 306 helps to aggregate feature level information in different facial regions, which helps local deformations caused by facial expressions. Actually, the neutral landmark graph G structure is first divided into K subset of vertices, each representing a facial region, e.g., eye, nose, etc. Next, the hierarchical convolution and pooling is applied during the encoding, to obtain the set of graph embedding features $f_l \in \mathbb{R}^d$ (d=128) (representing the entire neutral landmark graph G) for the training sample.

At step 204d, the set of emotion-invariant speech embedding features $f_a$ obtained at step 204a, the set of first emotion embedding features $f_e$ obtained step 204b, and the set of graph embedding features $f_l$ at step 204c, are concatenated to obtain concatenated embedding features of the training sample.

At step 204e, the concatenated embedding features of the training sample, is decoded to predict a landmark graph of the training sample, using the graph decoder network 308. The graph decoder network 308 reconstructs the landmark graph G'=(V', E, A) from the concatenated embedding features. The graph decoder network 308 learns the mapping f: ($f_a$, $f_e$, $f_l$)→X', where X'=X +δ represents the vertex position of the reconstructed facial landmarks with generated displacements δ induced by the speech and emotion. The predicted landmark graph G' comprises an ordered graph representation of predicted speech and emotion driven geometry-aware facial landmarks of the training sample for the training sample.

At step 204f, a loss function of the geometry-aware landmark generation network 300 is minimized. The loss function of the geometry-aware landmark generation network 300 computes a difference between the predicted landmark graph G' of the training sample, and a ground-truth landmark graph obtained from the ground-truth image corresponding to the training sample. More specifically the loss function ($L_{lm}$) of the geometry-aware landmark generation network 300 is mathematically represented as in equation 2:

$$L_{lm} = \lambda_{ver} L_{ver} + \lambda_{gan} L_{gan} \quad (2)$$

wherein $\lambda_{ver}$ and $\lambda_{gan}$ are the loss hyper parameters, $L_{ver}$ refers to the landmark vertex distance loss and the $L_{gan}$ refers to the adversarial loss. The value of the $\lambda_{ver}$ and $\lambda_{gan}$ are experimentally set as 1 and 0.5 respectively.

The landmark vertex distance loss $L_{ver}$ is mathematically expressed as in equation 3:

$$L_{ver} = \|\hat{X} - (X+\delta)\|_2^2 \quad (3)$$

wherein $\hat{X}$ represents the ground truth landmarks present in the ground-truth landmark graph obtained from the ground-truth image corresponding to the training sample.

The adversarial loss $L_{gan}$: A graph discriminator $D_L$ is used which evaluates the realism of the facial expressions in the predicted landmark graph G'. The geometry-aware landmark generation network 300 and the graph discriminator $D_L$ are trained using the LSGAN loss function, expressed in equations 4 and 5:

$$L_{gan}(D_L) = (\mathbb{E}[(D_L(\hat{G},e)-1)^2] + \mathbb{E}[(D_L(G',e)^2])/2 \quad (4)$$

$$L_{gan}(G_L) = (\mathbb{E}[(D_L(G',e)-1)^2]/2 \quad (5)$$

wherein G' is the predicted landmark graph G' of the training sample and $\hat{G}$ is the ground-truth landmark graph obtained from the ground-truth image corresponding to the training sample.

At step 204g, weights of the geometry-aware landmark generation network 300 are updated, based on the minimization of the loss function of the geometry-aware landmark generation network 300. The weights of the geometry-aware landmark generation network 300 are updated till either the loss minimum is achieved or converges to a nearest minimum loss function value, and the updated the geometry-aware landmark generation network is considered for the next iteration for training with the next training sample. Like this, the training process of the geometry-aware landmark generation network 300 is performed to obtain the trained speech and emotion driven geometry-aware landmark generation model.

Eye blinks are essential for realism of the synthesized face animation, but this is independent of speech. Hence, eye blink movements obtained by a pre-trained blink generation network, are added to the vertices of the predicted landmark graph G', to improve the accuracy in the generated talking face image.

At step 206 of the method 200, the one or more hardware processors 104 of the system 100 are configured to train a flow-guided texture generation network with the plurality of training samples received at step 202 of the method 200, to obtain a trained flow-guided texture generation model. The training of the flow-guided texture generation network is performed with the plurality of training samples and using the predicted landmark graph of each training sample obtained using the trained speech and emotion driven geometry-aware landmark generation model trained at step 204 of the method 200. In an embodiment, the training of the flow-guided texture generation network is performed with each training sample at a time, randomly selected from the plurality of training samples. In another embodiment, the training of the flow-guided texture generation network is performed with a set of training samples randomly selected based on the batch size, from the plurality of training samples and until the plurality of training samples is completed. Further, the training of the flow-guided texture generation network is performed until a number of epochs is completed where the plurality of training samples is present in each epoch.

The flow-guided texture generation network is constructed in such a way that it will generate the emotional talking face image for each training sample based on the emotion input data, the input image of a target subject present in the corresponding training sample and the predicted landmark graph corresponding to the training sample. Further, the flow-guided texture generation network is trained with the use of the ground-truth talking face image corresponding to the emotion input data present in each training sample, to obtain the trained flow-guided texture generation model.

Figure 4:
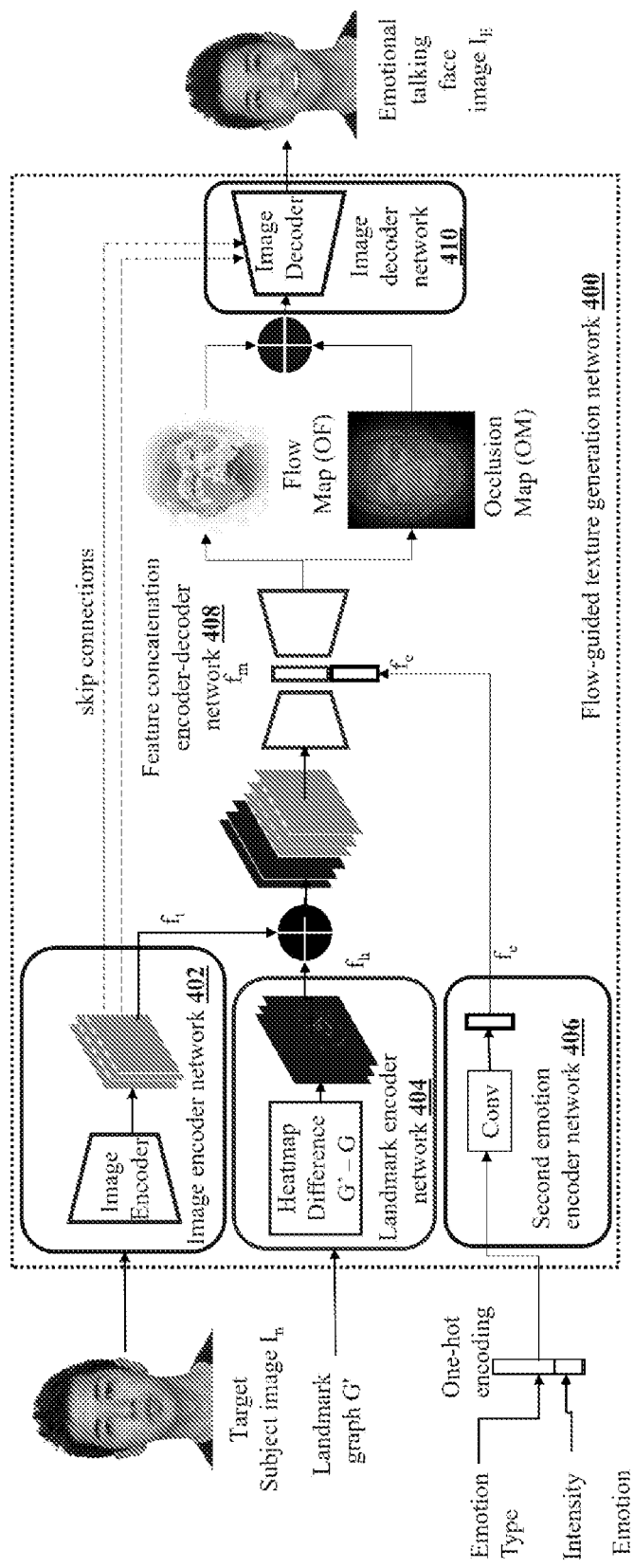
FIG. 4 shows an architecture diagram of a flow-guided texture generation network, in accordance with some embodiments of the present disclosure.

FIG. 4 shows an architecture diagram of the flow-guided texture generation network 400, in accordance with some embodiments of the present disclosure. As shown in FIG. 4, the flow-guided texture generation network 400 includes an image encoder network 402, a landmark encoder network 404, a second emotion encoder network 406, a feature concatenation encoder-decoder network 408, and an image decoder network 410.

In an embodiment, the image encoder network 402 includes a plurality of 2-dimensional (2-D) convolutional layers. In an embodiment, the landmark encoder network 404 also includes a plurality of 2-D convolutional layers. In an embodiment, the second emotion encoder network 406 includes a convolutional layer. In an embodiment, the feature concatenation encoder-decoder network 408 contains a plurality of 2-D convolutional layers followed by a plurality of up-sampling layers. In an embodiment, the image decoder network 410 includes a plurality of up-sampling layers.

The training of the flow-guided texture generation network 400 with each training sample is explained in detail through steps 206a to 206g. At step 206a, a set of identity features is obtained from the input image of the target subject in the neutral emotion present in the training sample, using the image encoder network 402. the image encoder network 402 encodes the input image $I_n$ of the target subject into the set of identity features $f_t$ which are used for predicting the optical flow map and the occlusion map in the subsequent stage.

At step 206b, a set of differential landmark features, is obtained from the predicted landmark graph G' of the training sample and the neutral landmark graph G corresponding to the input image of the target subject in the neutral emotion present in the training sample, as obtained at step 204c of the method 200, using the landmark encoder network 404. A heatmap is generated by creating a Gaussian distribution around each of the vertices of the landmark graph. The heatmap representation captures the structural information of the face in the image space and the local deformations around the vertices. In an embodiment, the set of differential landmark features are obtained in the form of a heatmap difference (G'−G) between the heatmap of the predicted landmark graph G' and the heatmap of the neutral landmark graph G.

The difference between the heatmaps of the neutral landmark graph G and the predicted landmark graph G' are computed to obtain the set of differential landmark features $f_h$.

At step 206c, a set of second emotion embedding features, is obtained from the emotion input data present in the training sample, in the similar manner as explained in step 204b of the method 200, using the second emotion encoder network 406. The architecture of the first emotion encoder 304 and the second emotion encoder 406 are similar and hence the second emotion encoder 406 includes the convolutional layer. First, the vector representation v(e, i) of the emotion input data, is obtained based on the emotion type e and the emotion intensity i present in the training sample, using the one-hot encoding technique. Then the vector representation v(e, i) of the emotion input data, is encoded using the second emotion encoder network 406, to obtain the set of second emotion embedding features $f_e \in \mathbb{R}^d$ (d=128) for the training sample.

At step 206d, the set of identity features $f_t$ obtained at step 206a, the set of differential landmark features $f_h$ obtained at step 206*b*, the set of second emotion embedding features $f_e$ obtained at step 206*c*, are combined, to obtain a dense flow map or also called as an optical flow map, and an occlusion map, for the training sample, using the feature concatenation encoder-decoder network 408.

The dense flow map captures the local deformations over different regions of the face due to speech and emotion induced motions. The occlusion map denotes the regions which need to be newly generated (e.g., inside the mouth region for happy emotion) in the final texture. The dense flow map and the occlusion map are learned in an unsupervised manner as represented in equation 6 and no ground truth dense flow map or the occlusion map are used for supervision.

First, the set of differential landmark features $f_h$ and the set of identity features $f_t$ are concatenated channel-wise and passed through an encoder network of the feature concatenation encoder-decoder network 408 to produce an intermediate encoded features $f_m$. Second, to influence the facial motion by the necessary emotion, the set of second emotion embedding features $f_e$ is concatenated channel-wise with the intermediate encoded features $f_m$ and are then lastly passed to a decoder network of the feature concatenation encoder-decoder network 408, to produce the dense flow map and the occlusion map. The flow guided texture generation from the set of differential landmark features $f_h$ of facial landmarks helps to learn the relationship between the face geometry and emotion-related deformations within the face.

At step 206*e*, the dense flow map and the occlusion map for the training sample obtained at step 206*d* are concatenated and the concatenated dense flow map and the occlusion map is passed to the image decoder network 410, to predict an emotional talking face image for the target subject present in the training sample. The predicted emotional talking face image $I_E$ comprises the speech audio input data and the induced emotion input data corresponding to the training sample. The predicted emotional talking face image $I_E$ is the animated face image in the form of video containing video frames. Skip connections are added between the layers of the image encoder network 402 and the image decoder network 410. The predicted emotional talking face image $I_E$ is mathematically expressed as in equation 6:

$$I_E = D_I(\text{dense flow map} \oplus \text{occlusion map, set of identity features } f_t) \quad (6)$$

At step 206*f*, a loss function of the flow-guided texture generation network 400 is minimized. The loss function of the flow-guided texture generation network 400 computes the difference between the predicted emotional talking face image $I_E$ (video frame) of the training sample, and the ground-truth image corresponding to the training sample. More specifically the loss function ($L_{img}$) of the flow-guided texture generation network 400 is mathematically represented as in equation 7:

$$L_{img} = \lambda_{rec} L_{rec} + \lambda_{per} L_{per} + \lambda_{adv} L_{adv} \quad (7)$$

wherein $\lambda_{rec}$, $\lambda_{per}$, and $\lambda_{adv}$ are the loss hyper parameters, $L_{rec}$ refers to a reconstruction loss, $L_{per}$ refers to a perceptual loss, and $L_{adv}$ refers to an adversarial loss. The value of the $\lambda_{rec}$, $\lambda_{per}$, and $\lambda_{adv}$ are experimentally set as 1, 10 and 1 respectively.

The reconstruction loss $L_{rec}$ is calculated between the predicted emotional talking face image $I_E$ of the training sample, and the ground-truth image $\hat{I}$ corresponding to the training sample. The reconstruction loss $L_{rec}$ is mathematically expressed as in equation 8:

$$L_{rec} = |I_E - \hat{I}| \quad (8)$$

The perceptual loss $L_{per}$ is calculated between VGG16 features (obtained from a pre-trained VGG16 face recognition model (not shown in FIG. 4)) of the predicted emotional talking face image $I_E$ of the training sample, and the ground-truth image $\hat{I}$ corresponding to the training sample. The reconstruction loss $L_{rec}$ is mathematically expressed as in equation 9:

$$L_{per} = |VGG16(I_E) - VGG16(\hat{I})| \quad (9)$$

The adversarial loss $L_{adv}$ along with a frame discriminator D is mathematically expressed as in equation 10:

$$L_{adv} = \mathbb{E}_{\hat{I}}[\log(D(l_e, l_n, \hat{I}))] + \mathbb{E}_{I_E}[\log(1 - D(l_e, l_n, I_E))] \quad (10)$$

At step 206*g*, weights of the flow-guided texture generation network 400 are updated, based on the minimization of the loss function of the flow-guided texture generation network 400. The weights of the flow-guided texture generation network 400 are updated, till either the loss minimum is achieved or converges to a nearest minimum loss function value, and the updated flow-guided texture generation network 400 is considered for the next iteration for training with the next training sample. Like this, the training process of the flow-guided texture generation network 400 is performed to obtain the trained flow-guided texture generation model. Hence the trained flow-guided texture generation model generates the emotional talking face image for each training sample based on the emotion input data, the input image of the target subject present in the corresponding training sample and the predicted landmark graph corresponding to the training sample.

At step 208 of the method 200, the one or more hardware processors 104 of the system 100 are configured to receive a speech audio data of interest, an emotion data of interest comprising the emotion type and the emotion intensity, and an image of an arbitrary target subject of interest in the neutral emotion for whom the emotion-controllable generalized talking face image to be generated.

At step 210 of the method 200, the one or more hardware processors 104 of the system 100 are configured to predict the landmark graph of the arbitrary target subject, from the speech audio data, the emotion data, and the image of the arbitrary target subject in the neutral emotion received at step 208 of the method 200, using the trained speech and emotion driven geometry-aware landmark generation model obtained at step 204 of the method 200. The predicted landmark graph of the arbitrary target subject includes the speech and emotion driven geometry-aware facial landmarks of the arbitrary target subject.

At step 212 of the method 200, the one or more hardware processors 104 of the system 100 are configured to generate an emotion-controllable generalized talking face image corresponding to the image of the arbitrary target subject in the neutral emotion received at step 208 of the method 200, based on the predicted landmark graph of the arbitrary target subject in the neutral emotion and the emotion data obtained at step 210 of the method 200, using a fine-tuned flow-guided texture generation model. Due to a limited variety in illumination, background in the training dataset, it is difficult to generalize the flow-guided texture generation network to arbitrary target faces. By fine-tuning the flow-guided texture generation model using a single image of the arbitrary target subject in neutral emotion, emotional talking face is generated in different emotions for the target face.

The fine-tuned flow-guided texture generation model is obtained by fine-tuning the trained flow-guided texture generation model obtained at step 206 of the method 200, with the image of the arbitrary target subject in neutral emotion, using one-shot learning. During fine-tuning of the flow-guided texture generation network, the layer weights of the image encoder network 402 and image decoder network 410 are only updated through loss backpropagation, keeping the layer weights fixed for the rest of the flow-guided texture generation network. Like this, the emotion-controllable generalized talking face image is generated with only the single neutral face image of the target subject of interest. The emotion-controllable generalized talking face image is the animated video containing face image frames.

The method and systems of the present disclosure adapt to arbitrary faces captured in-the-wild by fine-tuning with only a single image of the target subject in the neutral emotion. The present disclosure learns the relationship between the face geometry and the emotion-induced local deformations within the face, to generalize the texture deformation for any unknown face for a given emotion. Hence the generalization to an arbitrary unknown target face is achieved. The present disclosure efficiently generates the emotional talking face through one-shot learning, where the generated emotional talking face is in sync with the speech audio data based on the emotion type. Only a single image of the target person along with speech and an emotion vector is provided and hence the speech independent emotion control is achieved so that the same audio can be animated using different emotions.

Example Scenarios

Datasets: Three emotional audio-visual datasets are used namely: (i) MEAD [Wang et al., 2020], (ii) CREMA-D [Cao et al., 2014], and (iii) RAVDESS [Livingstone and Russo, 2018] for the experiments. 24 target subjects of diverse ethnicity are selected from MEAD for the training of the geometry-aware landmark generation network 300 and the flow-guided texture generation network 400 of the present disclosure, to obtain the trained speech and emotion driven geometry-aware landmark generation model and the trained flow-guided texture generation model, respectively. The methods and systems of the present disclosure is evaluated on test splits of MEAD, CREMA-D, RAVDESS, and also arbitrary unknown faces and speech data.

Implementation Details: The geometry-aware landmark generation network 300 and the flow-guided texture generation network 400 are trained independently. The flow-guided texture generation network 400 used the ground-truth landmarks as input during training, and predicted landmarks from the geometry-aware landmark generation network 300 as input during inference. The geometry-aware landmark generation network 300 and the flow-guided texture generation network 400 are trained using Pytorch on NVIDIA Quadro P5000 GPUs (16 GB) using Adam Optimizer, with a learning rate of 2e-4.

One-shot learning: The MEAD dataset contains a limited variety in illumination, background, etc which limits generalization to arbitrary target faces. By fine-tuning the flow-guided texture generation network 400 using a single image of any unseen target subject face (arbitrary target subject) in neutral emotion, the generalized emotional talking face is generated for the target subject in different emotions. The one-shot finetuning helps to bridge the color, illumination, and texture gap between the training and testing samples and can produce the texture of the target subject identity face while keeping the speech and emotion-related motions intact.

Quantitative Results: The emotion-controllable generalized talking face image results of the present disclosure are compared against the state-of-the-art (SOTA) emotional talking face generation methods for assessing all the essential attributes of a talking face, i.e., texture quality, lip sync, identity preservation, landmark accuracy, the accuracy of emotion generation, etc. Table 1 and Table 2 shows the quantitative. The emotional talking face SOTA methods MEAD [Wang et al., 2020], EVP [Ji et al., 2021], [Eskimez et al., 2020], [Chen et al., 2020] are dataset-specific and do not generalize well for arbitrary identities outside the training dataset. For fair comparison, the evaluation metrics of SOTA methods are reported for the respective dataset on which they are trained and evaluated. On the other hand, the performance of the present disclosure is not restricted to the training dataset. The present disclosure is trained only on MEAD dataset but evaluated on both MEAD and CREMA-D datasets.

TABLE 1

| Dataset | Method | Texture Quality | | | | Emotion | Identity |
| --- | --- | --- | --- | --- | --- | --- | --- |
| | | PSNR | SSIM | CPBD | FID | Accuracy | CSIM |
| MEAD | MEAD | 28.61 | 0.68 | 0.29 | 22.52 | 76.00 | 0.86 |
| | EVP | 29.53 | 0.71 | 0.35 | 7.99 | 83.58 | 0.67 |
| | Present disclosure | 30.06 | 0.77 | 0.37 | 35.41 | 85.48 | 0.79 |
| CREMA-D | Vougioukas et al. 2019 | 23.57 | 0.70 | 0.22 | 71.12 | 55.26 | 0.51 |
| | Eskimez et al 2020 | 30.91 | 0.85 | 0.39 | 218.59 | 65.67 | 0.75 |
| | Present disclosure | 31.07 | 0.90 | 0.46 | 68.45 | 75.02 | 0.75 |

TABLE 2

| Dataset | Method | Landmark Quality | | | | Lip sync |
| --- | --- | --- | --- | --- | --- | --- |
| | | M-LD | M-LVD | F-LD | F-LVD | |
| MEAD | MEAD | 2.52 | 2.28 | 3.16 | 2.011 | 1.83 |
| | EVP | 2.45 | 1.78 | 3.01 | 1.56 | 1.21 |
| | Present disclosure | 2.18 | 0.77 | 1.24 | 0.50 | 3.05 |
| CREMA-D | Vougioukas et al. 2019 | 2.90 | 0.42 | 2.80 | 0.34 | 1.12 |

TABLE 2-continued

| Dataset | Method | Landmark Quality | | | | Lip sync |
|---|---|---|---|---|---|---|
| | | M-LD | M-LVD | F-LD | F-LVD | |
| | Eskimez et al 2020 | 6.14 | 0.49 | 5.89 | 0.40 | 4.38 |
| | Present disclosure | 2.41 | 0.69 | 1.35 | 0.46 | 3.53 |

As shown in Table 1 and Table 2, the quantitative comparison results are evaluated in the form of the below metrics:

- Texture quality: The metrics a peak signal-to-noise ratio (PSNR), a structural similarity index (SSIM), a Cumulative Probability of Blur Detection (CPBD), and a Frechet inception distance (FID) are used for quantifying the texture quality of the synthesized image. The present disclosure outperforms over the SOTA methods in most of the texture quality metrics. The EVP outperforms all the methods in FID because they train person-specific models.
- Landmark quality: The metrics Landmark Distance (LD), Landmark Velocity Difference (LVD) are used to quantify the accuracy of lip displacements (M-LD and MLVD) and facial expressions (F-LD and F-LVD). On the CREMA-D dataset, although the velocity error metrics are slightly higher than SOTA methods, the landmark distance error metrics of the present disclosure are much lower than the SOTA, indicating more accurate animation.
- Identity preservation: The Cosine similarity (CSIM) metric is used between the predicted frame and the input identity face of the target subject. The present disclosure outperforms MEAD. EVP outperforms the present disclosure in CSIM as they train texture models specific to each target identity. On the other a single generalized texture model is used in the present disclosure for all identities. The one-shot learning helps to generalize on different subjects using only a single image of the target identity at inference time. Whereas EVP and MEAD require sample images of the target in different emotions for training their target-specific models.
- Emotion Accuracy: The emotion classifier network in EVP is for quantifying the accuracy of generated emotions in the final animation. On both the MEAD and CREMA-D datasets, the present disclosure achieved better emotion classification accuracy than that of the SOTA methods.
- Audi-Visual Sync.: A pre-trained network model (SyncNet) is used to estimate the audio-visual synchronization accuracy in the synthesized videos. The present disclosure achieves best lip sync. on MEAD dataset, and performs better than Vougioukas et al., 2019 on CREMA-D. While Vougioukas et al., 2019; Eskimez et al., 2020 are trained on CREMA-D, and the present disclosure is trained on MEAD and evaluated on CREMA-D.

Figure 5:
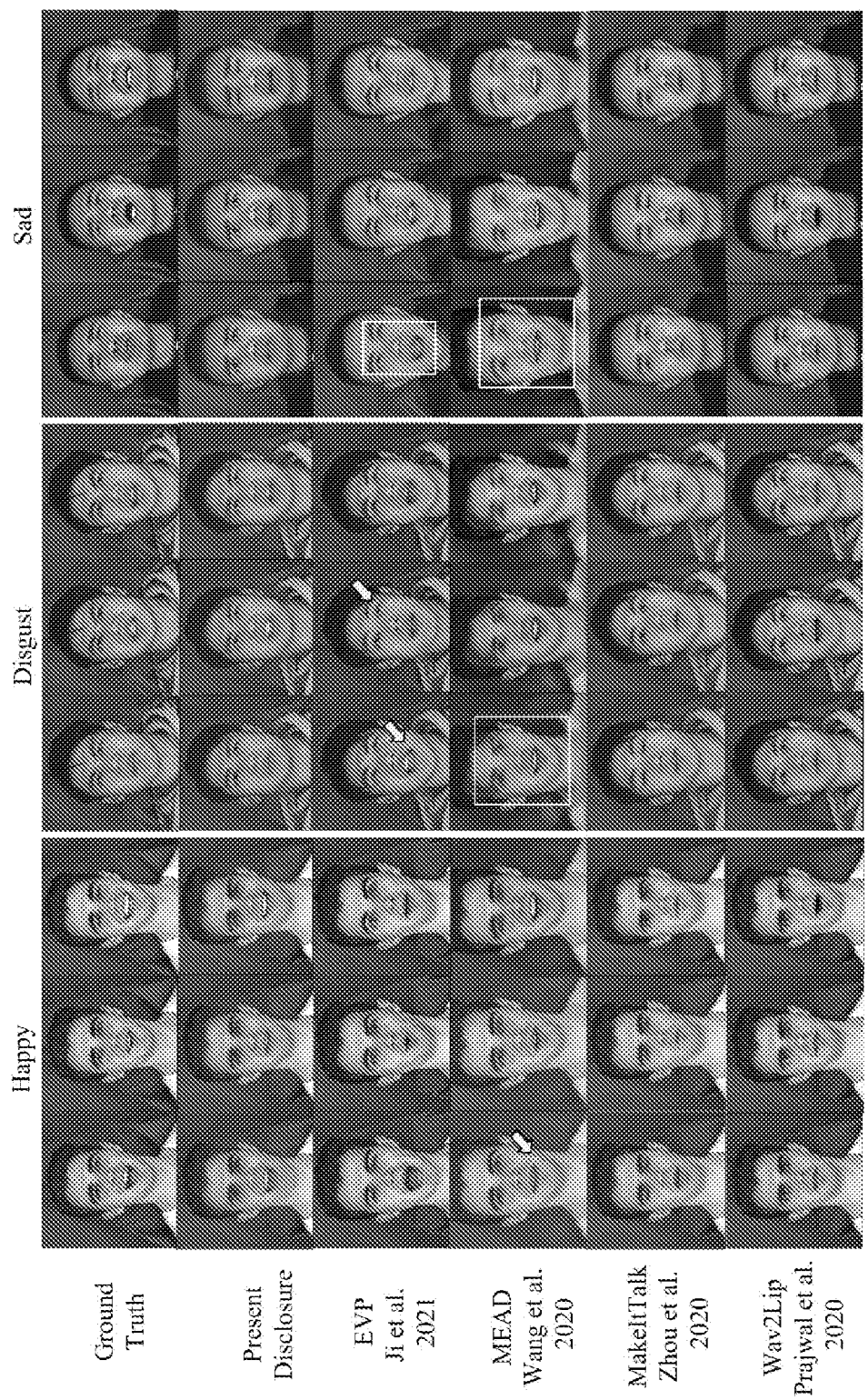
FIG. 5 shows qualitative results of the present disclosure on MEAD dataset in comparison to the state-of-the-art (SOTA) methods for emotional talking face generation.

Qualitative Evaluation: FIG. 5 shows qualitative results of the present disclosure on MEAD dataset in comparison to the state-of-the-art (SOTA) methods for emotional talking face generation. As shown in FIG. 5, the final animation results (the emotional talking face) on MEAD dataset are compared to the SOTA methods including MEAD, EVP, MakeitTalk [Zhou et al. 2020], and Wav2Lip [Prajwal et al. 2020]. The MEAD is evaluated using the available pre-trained model, which is specific to target subject 1 (First three columns) and fails to generalize for other subjects (column 4 to 9). The EVP fails to preserve the identity of the target subject 3 (columns 7 to 9) without finetuning the target subject 3. Also, the EVP uses a latent feature learned from audio for emotion control, which makes the expressions inconsistent (happy emotion can be perceived as surprised or angry for target subject 1, columns 1 to 3). The present disclosure produces better emotion and preserve identity even with one-shot learning using only a single neutral face image of the target subject.

Figure 6:
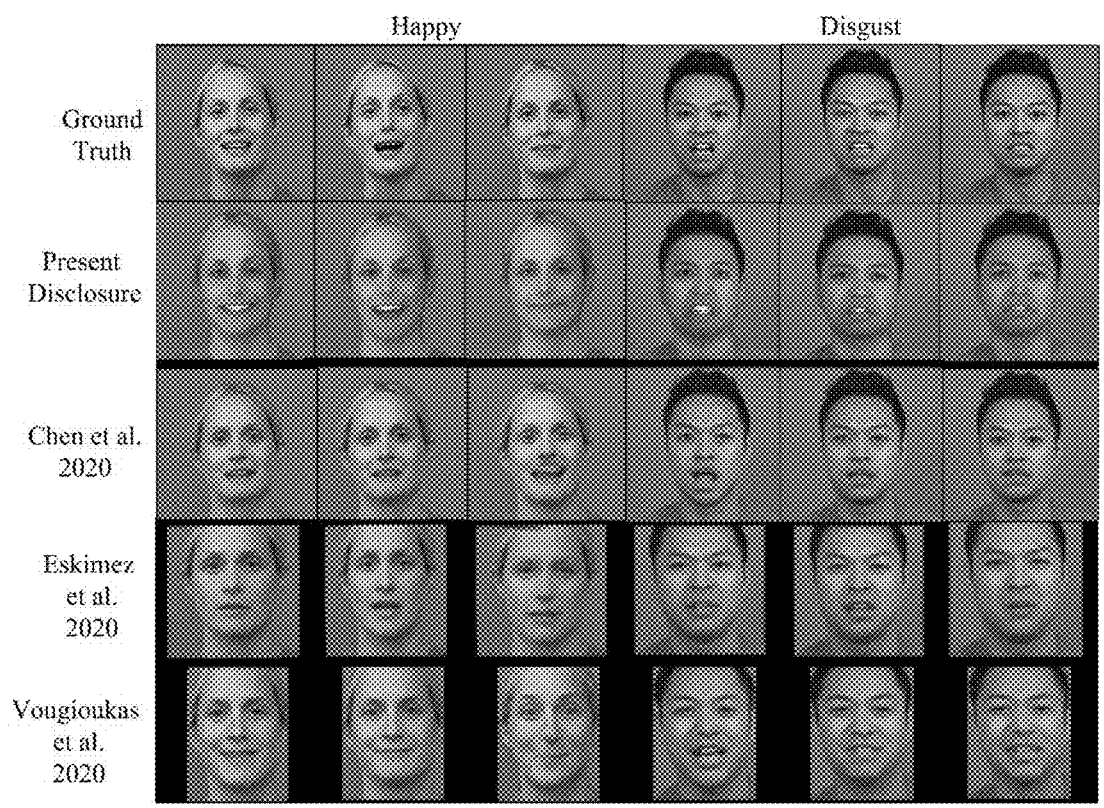
FIG. 6 shows qualitative results of the present disclosure on CREMA-D dataset in comparison to the state-of-the-art (SOTA) methods for emotional talking face generation.

FIG. 6 shows qualitative results of the present disclosure on REMA-D dataset in comparison to the state-of-the-art (SOTA) methods for emotional talking face generation. As shown in FIG. 6, the provided SOTA methods (except [Chen et al., 2020]) are trained on CREMA-D. The Eskimez et al., 2020 is unable to generate significant emotion. The Chen et al., 2020 produces distorted textures. The trained models of the present disclosure, though they are not trained on the CREMA-D dataset, still they are able to achieve better emotional talking face generation results.

The embodiments of present disclosure herein address unresolved problem of emotion-controllable generalized talking face image generation corresponding to the image of the arbitrary target subject in the neutral emotion effectively and accurately, with only using the single image of the arbitrary target subject. The experimental data also proves that the present disclosure outperforms over the SOTA methods for the emotion-controllable generalized talking face image generation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising the steps of:
   receiving, via one or more hardware processors, a plurality of training samples, wherein each training sample of the plurality of training samples comprises a speech audio input data, an emotion input data comprising an emotion type and an emotion intensity, an input image of a target subject in a neutral emotion, and a ground-truth image corresponding to the emotion input data;
   training, via the one or more hardware processors, a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises:
      obtaining a set of emotion-invariant speech embedding features, from the speech audio input data present in the training sample, using the audio encoder network;
      obtaining a set of first emotion embedding features, from the emotion input data present in the training sample, using the first emotion encoder network;
      obtaining a set of graph embedding features, from the input image of the target subject in the neutral emotion present in the training sample, using the graph encoder network;
      concatenating (i) the set of emotion-invariant speech embedding features, (ii) the set of first emotion embedding features, and (iii) the set of graph embedding features, to obtain concatenated embedding features of the training sample;
      decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample;
      minimizing a loss function of the geometry-aware landmark generation network, wherein the loss function computes a difference between the predicted landmark graph of the training sample, and a ground-truth landmark graph obtained from the ground-truth image corresponding to the training sample; and
      updating weights of the geometry-aware landmark generation network, based on the minimization of the loss function of the geometry-aware landmark generation network; and
   training, via the one or more hardware processors, a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises:
      obtaining a set of identity features from the input image of the target subject in the neutral emotion present in the training sample, using the image encoder network;
      obtaining a set of differential landmark features, from the predicted landmark graph of the training sample and the neutral landmark graph corresponding to the input image of the target subject in the neutral emotion present in the training sample, using the landmark encoder network;

obtaining a set of second emotion embedding features, from the emotion input data present in the training sample, using the second emotion encoder network;

combining (i) the set of identity features, (ii) the set of differential landmark features, (iii) the set of second emotion embedding features, to obtain a dense flow map and an occlusion map, for the training sample, using the feature concatenation encoder-decoder network;

passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample;

minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network.

2. The method of claim 1, wherein obtaining the set of emotion-invariant speech embedding features, from the speech audio input data present in the training sample, using the audio encoder network, comprises:

extracting a set of DeepSpeech features, from the speech audio input data present in the training sample, using a pre-trained DeepSpeech network; and encoding the set of DeepSpeech features, using the audio encoder network, to obtain the set of emotion-invariant speech embedding features for the training sample.

3. The method of claim 1, wherein obtaining the set of first emotion embedding features, from the emotion input data present in the training sample, using the first emotion encoder network, comprises:

obtaining a vector representation of the emotion input data, based on the emotion type and the emotion intensity present in the training sample, using a one-hot encoding technique; and encoding the vector representation of the emotion input data, using the first emotion encoder network, to obtain the set of first emotion embedding features.

4. The method of claim 1, wherein obtaining the set of graph embedding features, from the input image of the target subject in the neutral emotion present in the training sample, using the graph encoder network, comprises:

generating a neutral landmark graph, for the input image of the target subject in the neutral emotion present in the training sample, using a facial landmark extraction technique followed by a Delaunay triangulation; and encoding the neutral landmark graph, using the graph encoder network, to obtain the set of graph embedding features for the training sample, wherein the graph encoder network employs a graph convolution technique.

5. The method of claim 1, wherein obtaining the set of second emotion embedding features, from the emotion input data present in the training sample, using the second emotion encoder network, comprises:

obtaining a vector representation of the emotion input data, based on the emotion type and the emotion intensity present in the training sample, using a one-hot encoding technique; and encoding the vector representation of the emotion input data, using the second emotion encoder network, to obtain the set of second emotion embedding features.

6. The method of claim 1, further comprising:

receiving, via the one or more hardware processors, a speech audio data, an emotion data comprising the emotion type and the emotion intensity, and an image of an arbitrary target subject in a neutral emotion;

predicting, via the one or more hardware processors, the landmark graph of the arbitrary target subject, from the speech audio data, the emotion data, and the image of the arbitrary target subject in the neutral emotion, using the trained speech and emotion driven geometry-aware landmark generation model; and generating, via the one or more hardware processors, an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

7. A system comprising:

a memory storing instructions;

one or more input/output (I/O) interfaces; and one or more hardware processors coupled to the memory via the one or more I/O interfaces, wherein the one or more hardware processors are configured by the instructions to:

receive a plurality of training samples, wherein each training sample of the plurality of training samples comprises a speech audio input data, an emotion input data comprising an emotion type and an emotion intensity, an input image of a target subject in a neutral emotion, and a ground-truth image corresponding to the emotion input data;

train a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises:

obtaining a set of emotion-invariant speech embedding features, from the speech audio input data present in the training sample, using the audio encoder network;

obtaining a set of first emotion embedding features, from the emotion input data present in the training sample, using the first emotion encoder network;

obtaining a set of graph embedding features, from the input image of the target subject in the neutral emotion present in the training sample, using the graph encoder network;

concatenating (i) the set of emotion-invariant speech embedding features, (ii) the set of first emotion embedding features, and (iii) the set of graph embedding features, to obtain concatenated embedding features of the training sample;

decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample;

minimizing a loss function of the geometry-aware landmark generation network, wherein the loss function computes a difference between the predicted landmark graph of the training sample, and a ground-truth landmark graph obtained from the ground-truth image corresponding to the training sample; and updating weights of the geometry-aware landmark generation network, based on the minimization of the loss function of the geometry-aware landmark generation network; and train a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises:

obtaining a set of identity features from the input image of the target subject in the neutral emotion present in the training sample, using the image encoder network;

obtaining a set of differential landmark features, from the predicted landmark graph of the training sample and the neutral landmark graph corresponding to the input image of the target subject in the neutral emotion present in the training sample, using the landmark encoder network;

obtaining a set of second emotion embedding features, from the emotion input data present in the training sample, using the second emotion encoder network;

combining (i) the set of identity features, (ii) the set of differential landmark features, (iii) the set of second emotion embedding features, to obtain a dense flow map and an occlusion map, for the training sample, using the feature concatenation encoder-decoder network;

passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample;

minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network.

8. The system of claim 7, wherein the one or more hardware processors are configured to obtain the set of emotion-invariant speech embedding features, from the speech audio input data present in the training sample, using the audio encoder network, by:

extracting a set of DeepSpeech features, from the speech audio input data present in the training sample, using a pre-trained DeepSpeech network; and encoding the set of DeepSpeech features, using the audio encoder network, to obtain the set of emotion-invariant speech embedding features for the training sample.

9. The system of claim 7, wherein the one or more hardware processors are configured to obtain the set of first emotion embedding features, from the emotion input data present in the training sample, using the first emotion encoder network, by:

obtaining a vector representation of the emotion input data, based on the emotion type and the emotion intensity present in the training sample, using a one-hot encoding technique; and encoding the vector representation of the emotion input data, using the first emotion encoder network, to obtain the set of first emotion embedding features.

10. The system of claim 7, wherein the one or more hardware processors are configured to obtain the set of graph embedding features, from the input image of the target subject in the neutral emotion present in the training sample, using the graph encoder network, by:

generating a neutral landmark graph, for the input image of the target subject in the neutral emotion present in the training sample, using a facial landmark extraction technique followed by a Delaunay triangulation; and encoding the neutral landmark graph, using the graph encoder network, to obtain the set of graph embedding features for the training sample, wherein the graph encoder network employs a graph convolution technique.

11. The system of claim 7, wherein the one or more hardware processors are configured to obtain the set of second emotion embedding features, from the emotion input data present in the training sample, using the second emotion encoder network, by:

obtaining a vector representation of the emotion input data, based on the emotion type and the emotion intensity present in the training sample, using a one-hot encoding technique; and encoding the vector representation of the emotion input data, using the second emotion encoder network, to obtain the set of second emotion embedding features.

12. The system of claim 7, wherein the one or more hardware processors are further configured to:

receive a speech audio data, an emotion data comprising the emotion type and the emotion intensity, and an image of an arbitrary target subject in a neutral emotion;

predict the landmark graph of the arbitrary target subject, from the speech audio data, the emotion data, and the image of the arbitrary target subject in the neutral emotion, using the trained speech and emotion driven geometry-aware landmark generation model; and generate an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

13. One or more non-transitory machine-readable information storage mediums comprising one or more instructions which when executed by one or more hardware processors cause:

receiving, a plurality of training samples, wherein each training sample of the plurality of training samples comprises a speech audio input data, an emotion input data further comprising an emotion type and an emotion intensity, an input image of a target subject in a neutral emotion, and a ground-truth image corresponding to the emotion input data;

training, a geometry-aware landmark generation network, with each training sample at a time, until the plurality of training samples is completed, to obtain a trained speech and emotion driven geometry-aware landmark generation model, wherein the geometry-aware landmark generation network comprises an audio encoder network, a first emotion encoder network, a graph encoder network, and a graph decoder network, and wherein training the geometry-aware landmark generation network with each training sample comprises:

obtaining a set of emotion-invariant speech embedding features, from the speech audio input data present in the training sample, using the audio encoder network;

obtaining a set of first emotion embedding features, from the emotion input data present in the training sample, using the first emotion encoder network;

obtaining a set of graph embedding features, from the input image of the target subject in the neutral emotion present in the training sample, using the graph encoder network;

concatenating (i) the set of emotion-invariant speech embedding features, (ii) the set of first emotion embedding features, and (iii) the set of graph embedding features, to obtain concatenated embedding features of the training sample;

decoding the concatenated embedding features of the training sample, to predict a landmark graph of the training sample, using the graph decoder network, wherein the predicted landmark graph comprises an ordered graph representation of predicted speech and emotion driven geometry-aware facial landmarks of the training sample;

minimizing a loss function of the geometry-aware landmark generation network, wherein the loss function computes a difference between the predicted landmark graph of the training sample, and a ground-truth landmark graph obtained from the ground-truth image corresponding to the training sample; and updating weights of the geometry-aware landmark generation network, based on the minimization of the loss function of the geometry-aware landmark generation network;

training, a flow-guided texture generation network with each training sample at a time, until the plurality of training samples is completed, to obtain a trained flow-guided texture generation model, using the predicted landmark graph of each training sample, wherein the flow-guided texture generation network comprises an image encoder network, a landmark encoder network, a second emotion encoder network, a feature concatenation encoder-decoder network, and an image decoder network, and wherein training the flow-guided texture generation network with each training sample comprises:

obtaining a set of identity features from the input image of the target subject in the neutral emotion present in the training sample, using the image encoder network;

obtaining a set of differential landmark features, from the predicted landmark graph of the training sample and the neutral landmark graph corresponding to the input image of the target subject in the neutral emotion present in the training sample, using the landmark encoder network;

obtaining a set of second emotion embedding features, from the emotion input data present in the training sample, using the second emotion encoder network;

combining (i) the set of identity features, (ii) the set of differential landmark features, (iii) the set of second emotion embedding features, to obtain a dense flow map and an occlusion map, for the training sample, using the feature concatenation encoder-decoder network;

passing the dense flow map and the occlusion map for the training sample, to the image decoder network, to predict an emotional talking face image for the target subject present in the training sample, wherein the predicted emotional talking face image comprises the speech audio input data and the emotion input data corresponding to the training sample;

minimizing a loss function of the flow-guided texture generation network, wherein the loss function of the flow-guided texture generation network computes the difference between the predicted emotional talking face image of the training sample, and the ground-truth image corresponding to the training sample; and updating weights of the flow-guided texture generation network, based on the minimization of the loss function of the flow-guided texture generation network;

receiving, a speech audio data, an emotion data further comprising the emotion type and the emotion intensity, and an image of an arbitrary target subject in a neutral emotion;

predicting, the landmark graph of the arbitrary target subject, from the speech audio data, the emotion data, and the image of the arbitrary target subject in the neutral emotion, using the trained speech and emotion driven geometry-aware landmark generation model; and generating, an emotion-controllable generalized talking face image corresponding to the image of the arbitrary target subject in the neutral emotion, based on the predicted landmark graph of the arbitrary target subject in the neutral emotion and the emotion data, using a fine-tuned flow-guided texture generation model, wherein the fine-tuned flow-guided texture generation model is obtained by fine-tuning the trained flow-guided texture generation model with the image of the arbitrary target subject in neutral emotion, using one-shot learning.

* * * * *